US012631783B2

(12) United States Patent
Sharma et al.

(10) Patent No.: US 12,631,783 B2
(45) Date of Patent: May 19, 2026

(54) SYSTEM AND METHOD OF MULTI-LANE ELEVATED BODY TEMPERATURE PREVENTATIVE SCANNING SOLUTION USING GigE VISION AND TRACKING

(71) Applicant: Xtract One Technologies Inc., Toronto (CA)

(72) Inventors: Anmol Sharma, Vancouver (CA); Ryan David James Finn, Fredericton (CA); Philip Konrad Munz, Saint John (CA); Gudni Rosenkjaer, Roberts Creek (CA); James Allan Douglas Cameron, Fredericton (CA)

(73) Assignee: SILK WAY SERVICES INC.

( * ) Notice: Subject to any disclaimer, the term of this patent is extended or adjusted under 35 U.S.C. 154(b) by 328 days.

(21) Appl. No.: 18/353,824

(22) Filed: Jul. 17, 2023

(65) Prior Publication Data

US 2024/0019602 A1 Jan. 18, 2024

Related U.S. Application Data

(60) Provisional application No. 63/389,420, filed on Jul. 15, 2022.

(51) Int. Cl.
| | |
|---|---|
| *G01V 8/00* | (2006.01) |
| *G06T 7/246* | (2017.01) |
| *G06V 10/22* | (2022.01) |
| *G06V 20/52* | (2022.01) |
| *G06V 40/16* | (2022.01) |
| *G08B 21/18* | (2006.01) |
| *H04N 23/23* | (2023.01) |

(52) U.S. Cl.
CPC .............. *G01V 8/005* (2013.01); *G06T 7/246* (2017.01); *G06V 10/225* (2022.01); *G06V 20/52* (2022.01); *G06V 40/166* (2022.01); *G06V 40/171* (2022.01); *G06V 40/172* (2022.01); *G08B 21/18* (2013.01); *H04N 23/23* (2023.01); *G06T 2207/10048* (2013.01); *G06T 2207/30201* (2013.01)

(58) Field of Classification Search
CPC . G06T 2207/10048; G06T 2207/20081; G06T 2207/30201; G06T 7/246; G01V 8/005; G06V 10/225; G06V 20/52; G06V 40/161; G06V 40/166; G06V 40/171; G06V 40/172; H04N 23/23; G08B 13/19608; G08B 21/18
USPC .......................................... 382/103
See application file for complete search history.

(56) References Cited

U.S. PATENT DOCUMENTS

| | | | | |
|---|---|---|---|---|
| 11,170,593 B1 * | 11/2021 | Schneider | .............. | H04N 7/186 |
| 2010/0191077 A1 * | 7/2010 | O'Kane | ................. | A61B 5/164 |
| | | | | 600/306 |
| 2019/0094411 A1 * | 3/2019 | Anderton | ............... | G01N 22/00 |

(Continued)

*Primary Examiner* — Kenny A Cese

(57) ABSTRACT

A multi-lane elevated body temperature preventative scanning solution using GigE vision and tracking. This multi-lane solution is used to scan and track movement of people through an elevated body temperature scanning solution. When a person enters the frame, their identity (ID) is tracked within the field of view of the thermal camera in a designated scanning area from there it is monitored through the entry and exit of a premise to acquire a preventative temperature screening. Multiple machine learning and tracking routines are used together in this innovative offering.

20 Claims, 5 Drawing Sheets

(56) References Cited

U.S. PATENT DOCUMENTS

| 2022/0086370 A1* | 3/2022 | Kuybeda | G01J 5/0025 |
|---|---|---|---|
| 2022/0248296 A1* | 8/2022 | Merwaday | H04W 48/18 |
| 2023/0043342 A1* | 2/2023 | Tremblay | G06V 20/52 |
| 2023/0135198 A1* | 5/2023 | Osborne | G06Q 20/18 |
| | | | 705/16 |

\* cited by examiner

SYSTEM AND METHOD OF MULTI-LANE ELEVATED BODY TEMPERATURE PREVENTATIVE SCANNING SOLUTION USING GigE VISION AND TRACKING

CROSS REFERENCE TO RELATED APPLICATIONS

The application claims priority and the benefit of US Utility Patent Application Ser. No. 63/389,420, entitled "SYSTEM AND METHOD OF MULTI-LANE ELEVATED BODY TEMPERATURE PREVENTATIVE SCANNING SOLUTION USING GIGE VISION AND TRACKING", filed on Jul. 15, 2022, the disclosure of which is incorporated herein by reference in its entirety.

BACKGROUND

The embodiments described herein relate to security and surveillance, in particular, technologies related to threat detection via electronic means.

Current people scanning solutions exist in kiosk style setups with one thermal camera and a computer to run the temperature scanning software. Scan rates are usually one person at a time with an average scan time of 4-6 seconds per individual.

However, kiosk style scanning solutions may be disruptive and may impact businesses' regular patron flow (e.g., people need to queue up to get into a facility which may slow down traffic). Current single person scanning kiosk style solutions make a pre-deterministic scan in a 4-6 second window, only 1 person at a time. This creates choke points where patrons have to wait to be scanned.

There is a desire for multiple lane setup environments where a flow of patrons can be diverted to multiple scanning areas where they do not have to stop to be scanned.

SUMMARY

A multi-lane elevated body temperature preventative scanning solution using GigE vision and tracking. This multi-lane solution is used to scan and track movement of people through an elevated body temperature scanning solution. When a person enters the frame, their identity (ID) is tracked within the field of view of the thermal camera in a designated scanning area from there it is monitored through the entry and exit of a premise to acquire a preventative temperature screening. Multiple machine learning and tracking routines are used together in this innovative offering.

DETAILED DESCRIPTION

Figure 1:
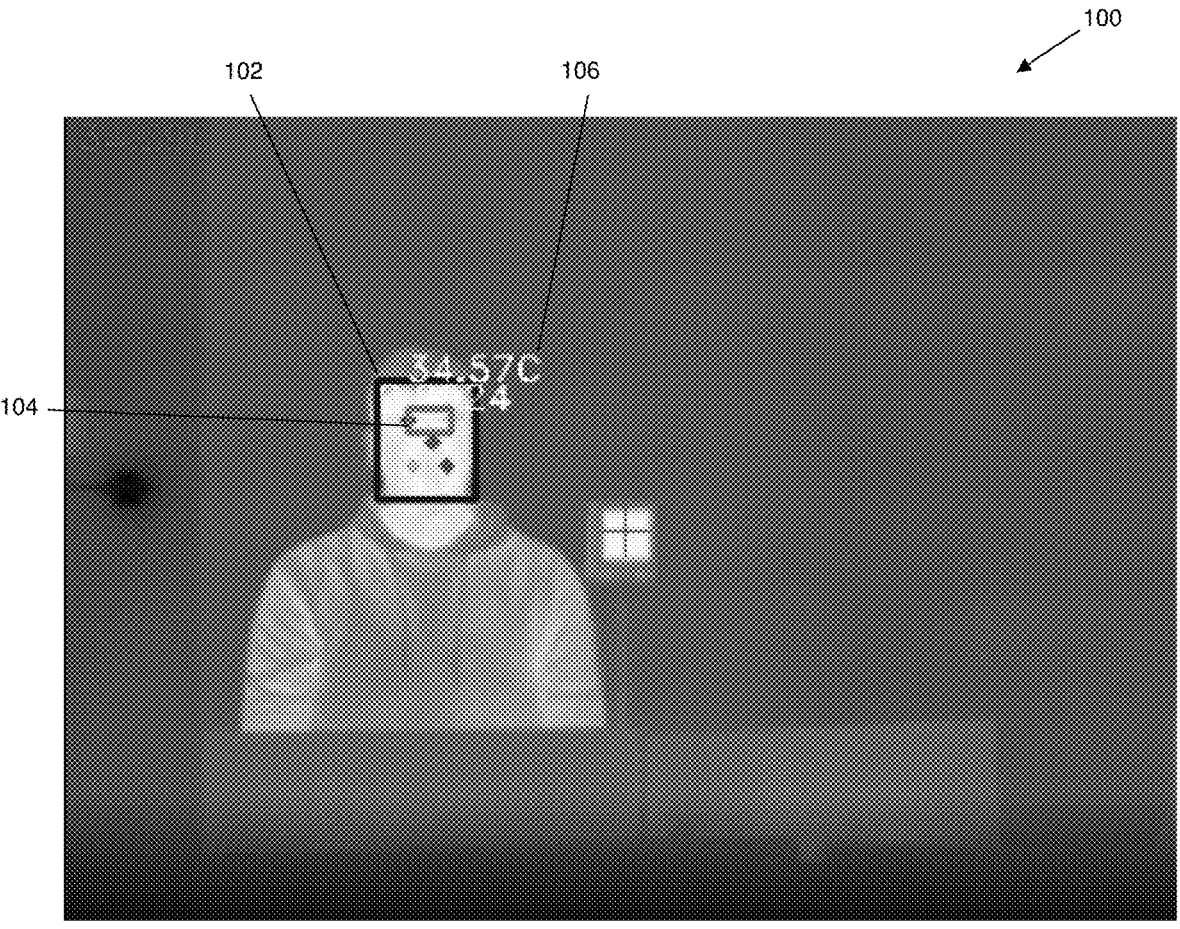
FIG. 1 is a diagram describing a single-person input and sub-framing.

Disclosed herein is a multi-lane setup environment where a flow of patrons can be diverted to multiple scanning areas where they do not have to stop to be scanned. This is due to state-of-the-art hardware, interwoven with machine learning and tracking algorithms. This setup includes using the open-source GigE Vision standard cameras and making them work in conglomeration with other machine learning and tracking based algorithms. Further, this disclosure eliminates the kiosk style setup of a multi-second pause per person (e.g., 4 to 6 seconds).

Operation

Operation of the solution is as follows; patrons start to flow into thermal camera video feed. The machine learning face detection algorithm starts to identify and localize faces that are in frame.

Furthermore, at the same time, a centroid tracking algorithm attaches itself to each 'ID' and is tracked until a valid, pre-deterministic screening is accomplished. If the temperature is above a threshold, staff on site are notified and shown where this screened subject would be. They would then be taken aside for a secondary screening with a medical grade thermometer.

According to embodiments of this disclosure, a thermal camera (e.g., FLIR thermal camera) is used to grab a radiometric image (e.g., thermal data) where each pixel of the image is a number representing a temperature. The thermal camera takes an image or series of images and is sent out from the camera to a $3^{rd}$ party software that interfaces with the camera.

Open-source and internally developed artificial intelligence (AI) software repositories are used to analyze thermal image data. Multiple AI routines are put in parallel to create a solution capable of scanning multiple people in an image.

According to the disclosure, after the camera captures a series of images and sent to a $3^{rd}$ party interface software, including interfacing software with a threat detection system (e.g., Xtract One), an AI face detector algorithm is used to detect where the faces are in the image and the relative points on the face (e.g., relative points on the face) to read the temperature. The face detector algorithm may be an off-the-shelf solution (e.g., Retinaface) that identifies specific pixels to determine temperature.

Current solutions in the market require a person to stand in front of the camera for up to 4-6 seconds and wait for a reading. This differs from this disclosure where 1 thermal camera is used to track multiple people in an image (e.g., create a multiple tracking pipeline). According to this disclosure, a thermal camera has been tested up to multiple people in a frame (e.g., 5 people) and capable of grabbing temperatures for each subject. For example, the thermal camera can detect people walking through in real-time (or close to real-time with no noticeable lag), track them, place a box (e.g., green box) around their face and detect the person's surface temperature.

AI algorithms are used for facial tracking and key-point detection. According to the disclosure, facial tracking and key-point detection are applied to each face in the image. The algorithm detects and tracks each face seen by the camera and makes sure as the person moves, the algorithm can track these key points of the face(s). Thereafter, the AI algorithm finds the max temperature around the key-points. Then the facial max surface temperature is reported. If the perceived surface temperature is greater than 37.38° Celsius, it is classified as a possible elevated temperature (e.g., fever or illness) and a notification is triggered through the AI platform UI to the screening user. Then this person would be sent for secondary screening or asked to leave the premises.

FIG. 1 is a diagram describing a single-person input and sub-framing. As seen in diagram 100 of FIG. 1, a box 102 is drawn around the face and a further box 104 is drawn around the eyes. Three dots are used to identify features of the face. The person's temperature 106 (e.g., 34.57° C.) is also shown on diagram 1022.

Figure 2:
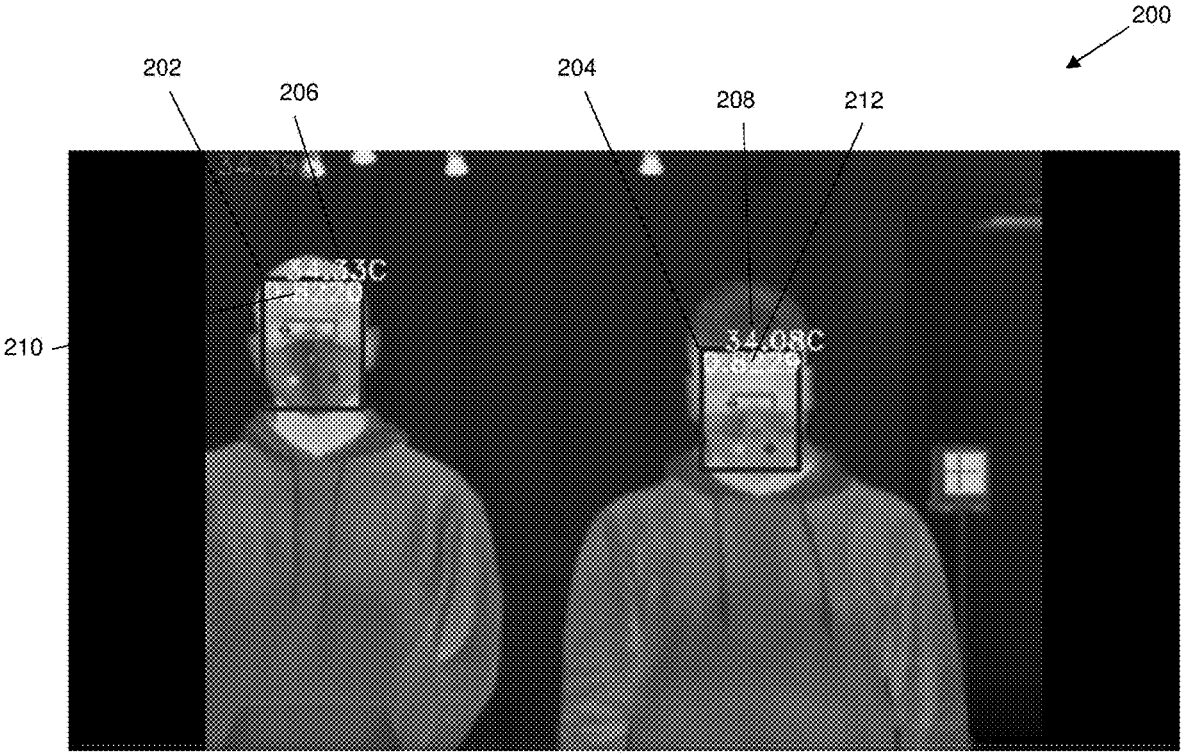
FIG. 2 is a diagram describing a two-person input and sub-framing.

FIG. 2 is a diagram describing a two-person input and sub-framing. As seen in diagram 200 of FIG. 2, two boxes 202 and 204 are drawn around the faces of the two people. The eyes are also identified by two smaller boxes 202 and 204. The person's temperature 206 and 208 (e.g., 34.33° C. and 34.08° C.) and the face detector classifier confidence level 210 and 212 (e.g., 0.8220 and 0.8229) are also shown.

The confidence level is a value from 0 to 1 indicating the confidence of the face detector model that the area in a box 202 and 204 is a face. According to FIG. 2, the system is –82% that area in boxes 202 and 204 is a face. According to the disclosure, the confidence level would not be shown to the user; the confidence values would be used by the algorithm to filter out frames which might include things that appear to the camera as a face, but which are not faces.

Figure 3:
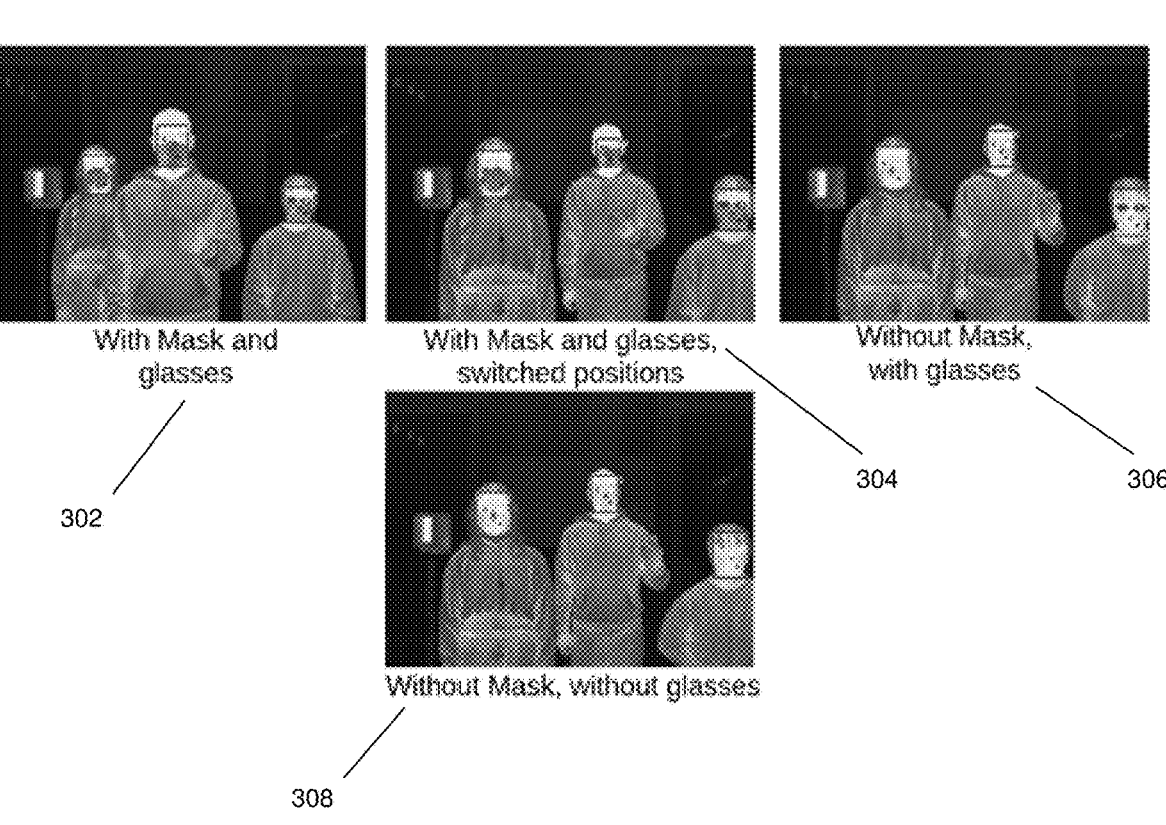
FIG. 3 is a diagram describing a three-person input and sub-framing.

FIG. 3 is a diagram describing a three-person input and sub-framing. As seen in diagram 300 in FIG. 3, faces are depicted by multiple people and are highlighted by a box for each respective person in the field of view. The highlighting of the face works on people with mask and glasses 302, with mask and glasses with people switching positions 304, without mask with glasses, and without mask without glasses 306 and 308. Note that this analytic is not limited to only three people in frame, one can identify as many faces as could reasonably fit in the camera field of view, with a certain level of resolution.

Figure 4:
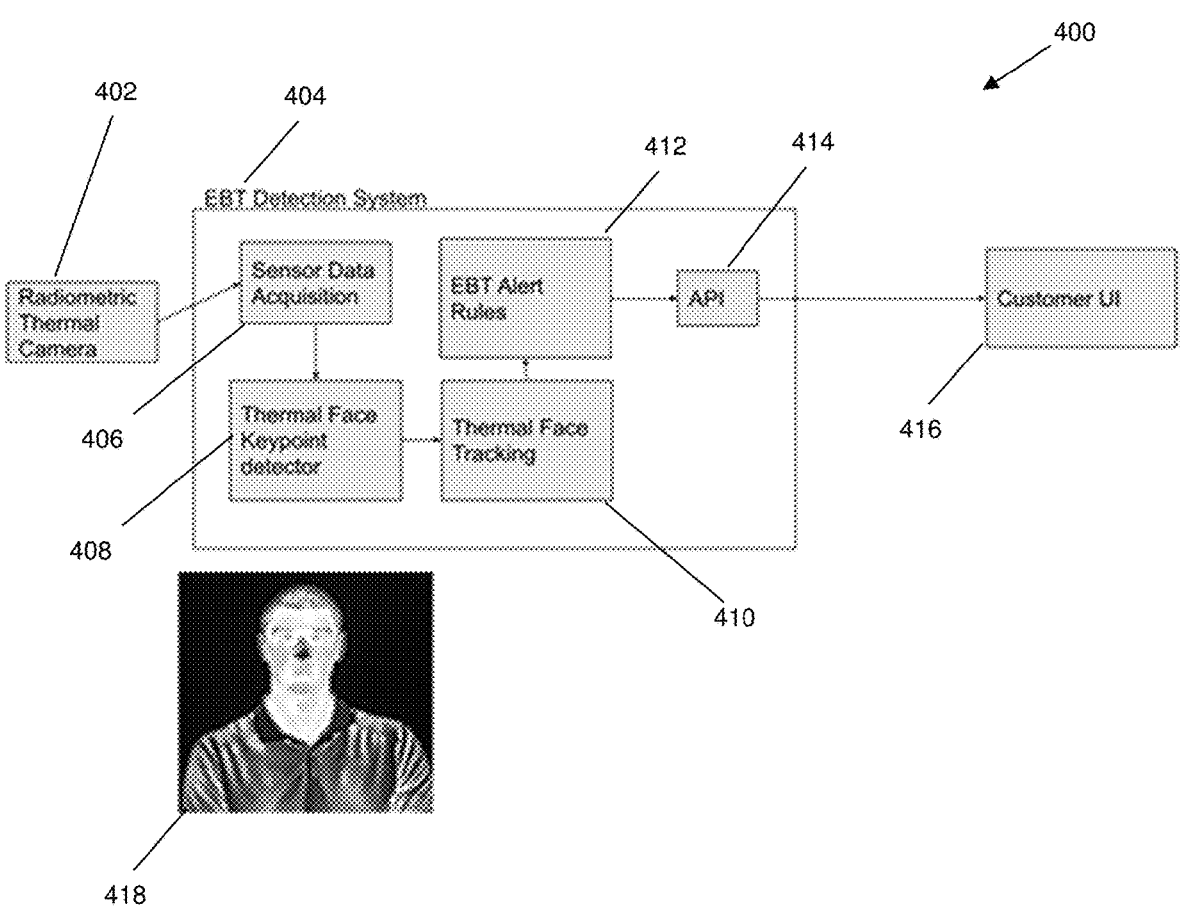
FIG. 4 is a diagram describing a high-level overview of how the platform runs analytics.

FIG. 4 is a diagram describing a high-level overview of how the platform runs analytics. As seen in diagram 400 of FIG. 4, a radiometric thermal camera 402 captures an image 418. The image 418 is sent to an Elevated Body Temperature (EBT) detection system 404 consisting of a Sensor Data Acquisition module 406, a Thermal Face Keypoint detector 408, a Thermal Face Tracking module 410, an EBT Alert Rules module 412 and one or more interface application programing interfaces (APIs) 414. Once the data is computed through the EBT Detection System 404, the output is sent out to a Customer User Interface (UI) 416 including a graphical user interface (display), email or text message notification.

Figure 5:
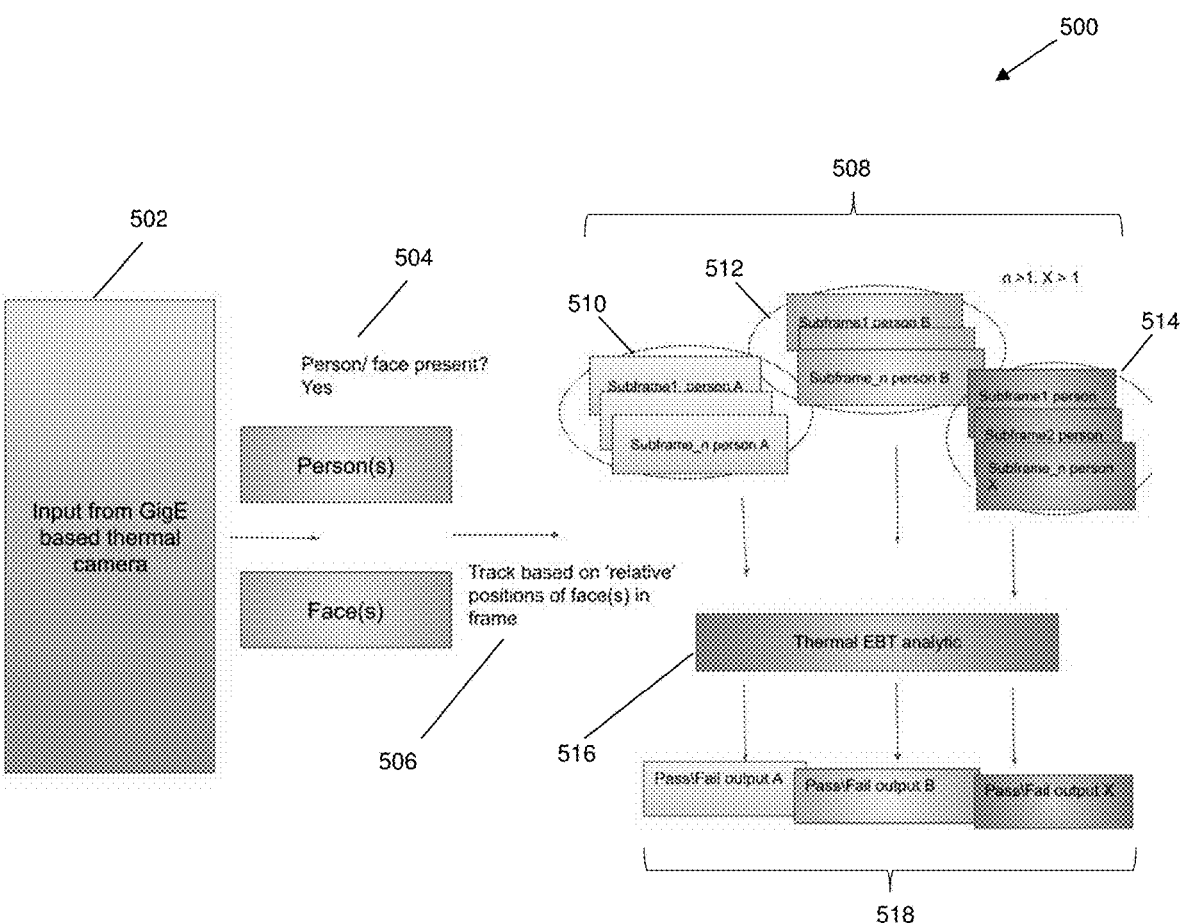
FIG. 5 is a diagram illustrating a more detailed description of the analytic workflow in the Elevated Body Temperature (EBT) detection system

FIG. 5 is a diagram illustrating a more detailed description of the analytic workflow in the Elevated Body Temperature (EBT) detection system (i.e., the boxed part of the previously defined images to identify more than 1, 2 or 3 faces).

According to system 500 of FIG. 5, input is received from a GigE based thermal camera at step 502. System 500 then determines whether a person and face is present at step 504. The system 500 then tracks based on "relative" position of the face(s) in the frame at step 506. System 500 then breaks down each person into a queue of sub-frame images at step 508. According to the disclosure, if there are multiple people, the sub-frame images will include set1 510 including "subframe 1 person A" to "subframe n person A", set2 512 including "subframe 1 person B" to "subframe n person B" and set3 514 including "subframe 1 person X" to "subframe n person X".

The data is then sent to a Thermal EBT analytics module at step 516 which computes and provides an output of pass or fail for each individual at step 518. According to FIG. 5, the system currently determines whether each person passes/ fails on elevated temperature scanning, however, future embodiments of the invention can also make other deterministic computations (e.g., does the target have a gun/ weapon/drugs, etc.).

The serialization of multiple smart sensor/very accurate thermal camera hardware with machine learning based face detection and person centroid-based tracking software, whereas a venue or business now can let a steady flow of patrons through many entrance ways with minimal security staff. These staff can now focus on other security threats.

The proposed solution in this disclosure enables the ability to support multiple different camera vendors to the point of being thermal camera brand agnostic. This solution is thermal camera agnostic over several manufactured equipment brands.

In a further embodiment, future camera design with zoom-in lens with fixed longer zoom may be used. For example, zoom-in lens can be used to track people turning the corner 50-60 feet away. The camera can start tracking and the zoom-in lens can look in the far-field for prescreening. When they (people in the field of view) get closer tracking, they are passed from zoom camera to closer-field view or smaller lens thermal camera. Accordingly, the camera may work from a range of 20 to 35 feet where a thermal camera may work from a closer range of 6 to 15 feet.

In further embodiments, the system may consider passing or coordinate tracking from 1 engine to another. For example, the system will read temperature, map skin temperature to internal temperature and model internal/external temperature. The system can then take further readings and map to perceived readings (e.g., patterning approach, AI or machine learning algorithm) to simulate results.

According to the disclosure, a multi-lane elevated body temperature preventative scanning system using GigE vision and tracking is disclosed. The scanning system comprises a radiometric thermal camera configured to capture an image, an elevated body temperature (EBT) detection system configured to compute the data, a sensor data acquisition module, a thermal face keypoint detector, a thermal face tracking module, an EBT Alert Rules module and one or more interface application programing interfaces (APIs), a user interface (UI) configured to display the output of the data.

According to the disclosure, the scanning system is configured to scan and track movement of people through the EBT detection system. The thermal camera of the system is a GigE based thermal camera. The user interface (UI) of the system displays the data using a graphical user interface (GUI) display or sends an email or text message notification.

According to the disclosure, when a person enters the frame of the system, their identity (ID) is tracked within the field of view of the thermal camera in a designated scanning area. The person is then monitored through the entry and exit of a premise to acquire a preventative temperature screen. Furthermore, the system utilizes one or more machine learning and tracking routines either individually or in combination.

According to the disclosure, a computer-implemented method of multi-lane elevated body temperature (EBT) preventative scanning using GigE vision and tracking scanning system is disclosed. The method comprising the steps of receiving image data from a thermal camera, determining that a person and a face is present from the image data, tracking the person based on the relative position of the face in the frame of the image data, classifying the image data into sub-frame images of one or more person; computing whether the person passes an elevated temperature scan and sending a notification to a user interface (UI) configured to display the output of the data wherein the computing step is provided by a thermal elevated body temperature (EBT) analytics module.

According to the disclosure, the thermal camera of the method is a GigE based thermal camera. The computing step of the method determines whether each person passes or fails on elevated temperature scan. The computing step of the method further comprises scanning for guns, weapons or drugs. According to the disclosure, the user interface (UI) of the method displays the data using a graphical user interface (GUI) display or sends an email or text message notification.

According to the disclosure, when a person enters the frame in the method, their identity (ID) is tracked within the field of view of the thermal camera in a designated scanning area. The person is also monitored through the entry and exit of a premise to acquire a preventative temperature screen.

According to the disclosure, the method further comprises the step of using a machine learning face detection algorithm to identify and localize faces that are in frame.

According to the disclosure, the method further comprises the step of using a centroid tracking algorithm that attaches itself to each ID and is tracked until a valid, pre-deterministic screening is accomplished. According to the disclosure, if the temperature is above a threshold of the method, staff on site are notified and shown where this screened subject would be and taken aside for a secondary screening.

According to the disclosure, the step of determining that a person and a face is present in the method is done using thermal camera by drawing box around the face and eyes wherein the person's temperature and face detector classifier confidence level is provided. The face detector classifier confidence level is a value from 0 to 1 indicating the confidence of the face detector model.

Implementations disclosed herein provide systems, methods and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A multi-lane elevated body temperature preventative scanning system using GigE vision and tracking, the scanning system comprising:

a radiometric thermal camera configured to capture an image;

an elevated body temperature (EBT) detection system configured to compute temperature data, the EBT detection system further comprising:

a sensor data acquisition module;

a thermal face keypoint detector;

a thermal face tracking module;

an EBT Alert Rules module; and one or more interface application programing interfaces (APIs);

a user interface (UI) configured to provide an output;

wherein the system further comprises a far-field thermal camera with a zoom-in lens and a near-field thermal camera, and a tracking engine configured to:

pre-screen people with the far-field thermal camera using the zoom-in lens;

hand off tracking of each person from the far-field thermal camera to the near-field thermal camera as the person approaches a designated scanning area; and for each person, build a time-ordered queue of sub-frame facial images and determine the person's EBT result from an aggregation across the queued sub-frames;

wherein the scanning system is configured to scan and track movement of people through the EBT detection system without requiring a stop-and-hold pause at the designated scanning area.

2. The system of claim 1, wherein the sensor-data acquisition module receives frames via a GigE vision interface.

3. The system of claim 1, wherein the user interface (UI) is configured to provide graphical displays of EBT determinations and automated alerts including text or email messages.

4. The system of claim 1, wherein the thermal face keypoint detector outputs both facial keypoint temperatures and a per-frame face-detector confidence value.

5. The system of claim 4, wherein the aggregation across the queued sub-frames excludes frames having the face-detector confidence below a threshold;

wherein the aggregation comprises computing a maximum of facial keypoint temperatures across the person's sub-frame queue; and wherein the aggregation comprises computing a median of facial keypoint temperatures across the person's sub-frame queue.

6. The system of claim 1, wherein the tracking engine maintains person-specific queues that span both the far-field and near-field time intervals to provide a continuous EBT analysis across the hand-off.

7. The system of claim 1, wherein the tracking engine maintains person-specific queues that span both the far-field and near-field time intervals to provide a continuous EBT analysis across the hand-off.

8. The system of claim 1, wherein the far-field thermal camera is configured to pre-screen multiple lanes and the near-field thermal camera is positioned at the designated scanning area to capture higher-resolution facial regions.

9. The system of claim 1, wherein the designated scanning area is configured for walk-through, multi-lane throughput such that persons do not have to stop to be scanned; and the EBT-alert rules module applies per-lane or global alert thresholds.

10. A computer-implemented method of multi-lane elevated body temperature (EBT) preventative scanning using GigE vision and tracking scanning system, the method comprising the steps of:

receiving thermal image data from a far-field thermal camera with a zoom-in lens and from a near-field thermal camera;

detecting faces and tracking persons with the far-field thermal camera and handing off tracking to the near-field thermal camera upon approach to a designated scanning area;

for each person, generating a time-ordered queue of sub-frame facial images across the hand-off interval and aggregating temperature values derived from facial keypoints across the queue to determine an EBT pass/fail result; and providing a notification to a UI indicative of the per-person EBT result.

11. The computer-implemented method of claim 10, wherein the aggregation comprises:

computing a maximum across the sub-frame queue and rejecting frames with a confidence below a threshold; and computing a median across the sub-frame queue.

12. The computer-implemented method of claim 10, wherein the user interface (UI) provides graphical indications and automated text or email alerts for EBT results.

13. The method of claim 10, wherein the handing off of tracking is coordinated between different analytics engines executing on separate processors.

14. The method of claim 10, further comprising pre-screening persons in the far-field to initialize tracking prior to arrival at the designated scanning area.

15. The method of claim 10, wherein persons are scanned while walking through the designated scanning area without stopping.

16. A non-transitory computer-readable medium storing instructions that, when executed by one or more processors, cause a system to perform operations comprising:

receiving thermal image data from a far-field thermal camera with a zoom-in lens and from a near-field thermal camera;

detecting faces and tracking persons with the far-field thermal camera and handing off tracking to the near-field thermal camera;

building a time-ordered queue of sub-frame facial images for each person across the hand-off interval;

aggregating facial-keypoint temperatures across the queue to determine an EBT pass/fail result; and outputting the result to a user interface (UI).

17. The non-transitory computer-readable medium of claim 16, wherein the operations further comprise excluding sub-frames with detector confidence below a threshold and computing a maximum across remaining sub-frames.

18. The non-transitory computer-readable medium of claim 16, wherein the operations further comprise exposing EBT results via one or more APIs.

19. The non-transitory computer-readable medium of claim 16, wherein the operations further comprise presenting lane-level status and generating automated alerts.

20. The non-transitory computer-readable medium of claim 16, wherein the operations further comprise maintaining and clearing person-specific sub-frame queues upon finalization of the EBT decision.

* * * * *